(12) United States Patent
Lim et al.

(10) Patent No.: US 7,941,043 B2
(45) Date of Patent: May 10, 2011

(54) AUTOMATIC FOCAL POINT CONTROL FOR CAMERA

(75) Inventors: Dae-Soon Lim, Yongin-Si (KR); Kyung-Ho Kim, Hwaseong-Si (KR); Jae-Hyuk Lee, Gyeongsan-Si (KR)

(73) Assignee: Sung Woo Electronics Co., Ltd., Ansan-si (KR)

( * ) Notice: Subject to any disclaimer, the term of this patent is extended or adjusted under 35 U.S.C. 154(b) by 0 days.

(21) Appl. No.: 12/529,668

(22) PCT Filed: Dec. 27, 2007

(86) PCT No.: PCT/KR2007/006899
§ 371 (c)(1),
(2), (4) Date: Sep. 2, 2009

(87) PCT Pub. No.: WO2008/108533
PCT Pub. Date: Sep. 12, 2008

(65) Prior Publication Data
US 2010/0086294 A1    Apr. 8, 2010

(30) Foreign Application Priority Data

Mar. 8, 2007   (KR) .......................... 10-2007-0022944

(51) Int. Cl.
*G03B 3/10*   (2006.01)
*G02B 7/04*   (2006.01)

(52) U.S. Cl. ........................................ 396/144; 396/133

(58) Field of Classification Search .................... 396/73, 396/75, 133, 144
See application file for complete search history.

(56) References Cited

U.S. PATENT DOCUMENTS

| | | | | |
|---|---|---|---|---|
| 4,519,691 A | * | 5/1985 | Yamada et al. | 396/144 |
| 5,835,799 A | * | 11/1998 | Washisu | 396/55 |
| 2004/0174614 A1 | * | 9/2004 | Hovanky | 359/694 |
| 2006/0034599 A1 | * | 2/2006 | Osaka | 396/144 |
| 2007/0154198 A1 | * | 7/2007 | Oh et al. | 396/85 |

FOREIGN PATENT DOCUMENTS

| | | |
|---|---|---|
| JP | 2005-122026 A1 | 5/2005 |
| JP | 2005-128362 A1 | 5/2005 |
| JP | 2005-266521 A1 | 9/2005 |
| KR | 1005548869 B1 | 1/2006 |

* cited by examiner

*Primary Examiner* — Rodney E Fuller
(74) *Attorney, Agent, or Firm* — Blank Rome LLP

(57) ABSTRACT

An automatic focal point control apparatus is provided. The apparatus includes a base fixed in the camera, which includes a cylindrical projection extending from a top surface thereof and into which part of a lens barrel is inserted; a bobbin inserted into the cylindrical projection on the base that includes a plurality of electromagnets around which coils are wound; a rotation body that includes a support ring rotatably connected to the outer circumference of the adaptor and a ring-shaped permanent magnet fixed onto an outer surface of the support ring and that has a plurality of N poles and an equal number of S poles alternately arranged at regular intervals; and a housing detachably mounted on the base that includes a space unit formed inside that includes the bobbin, rotation body and adaptor, and a through hole formed inside so that light and image are projected onto the adaptor.

8 Claims, 4 Drawing Sheets

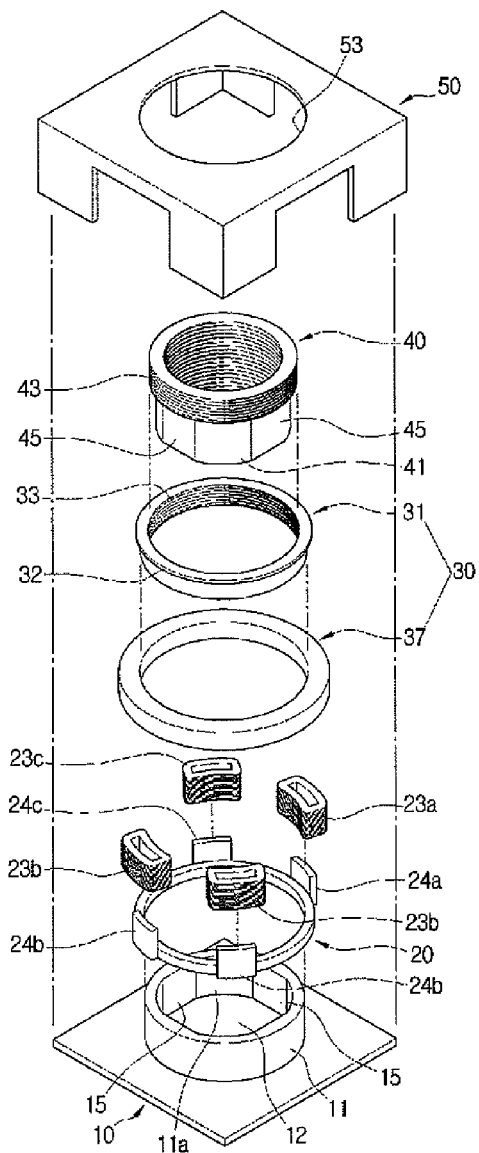
[Fig. 1]
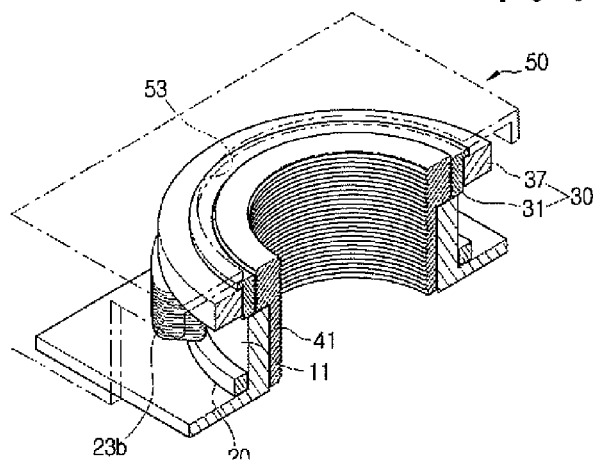
[Fig. 2]

[Fig. 3]
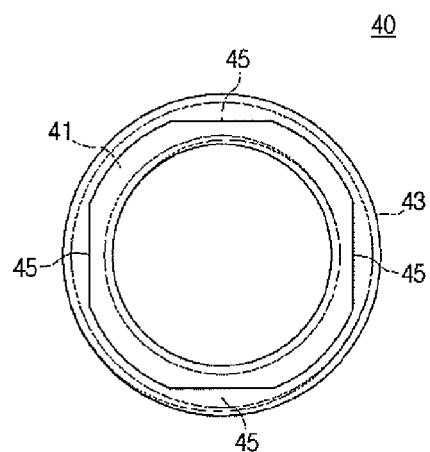
[Fig. 4]
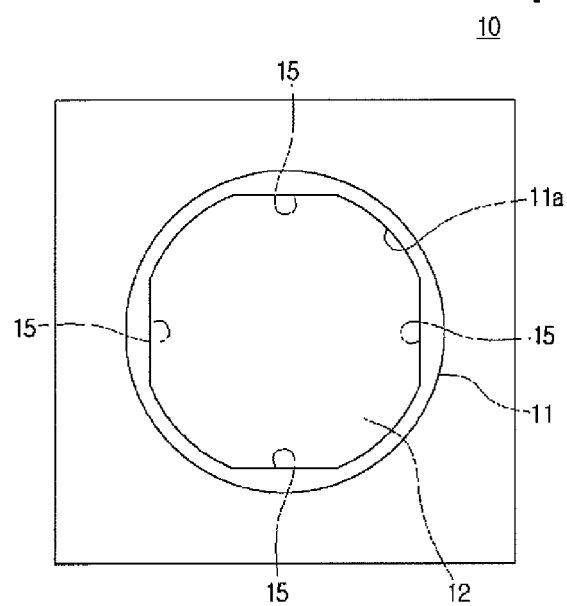
[Fig. 5]
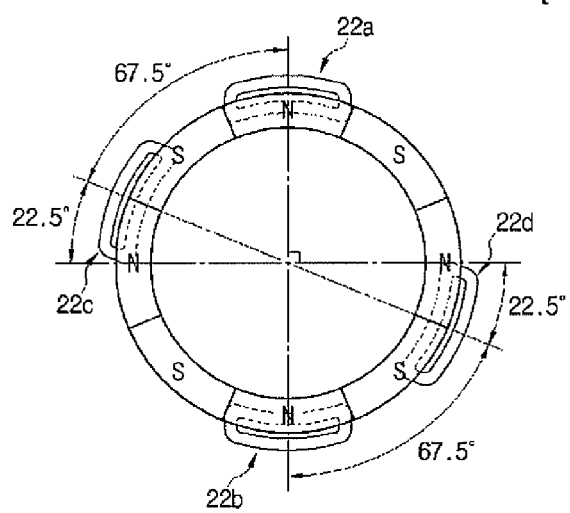

[Fig. 6]
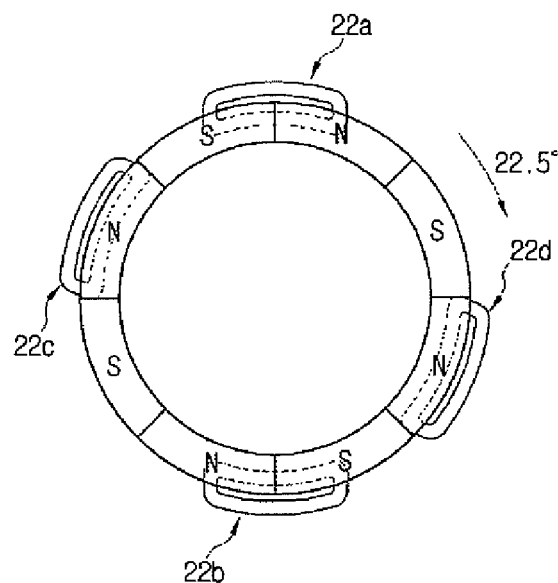
[Fig. 7]
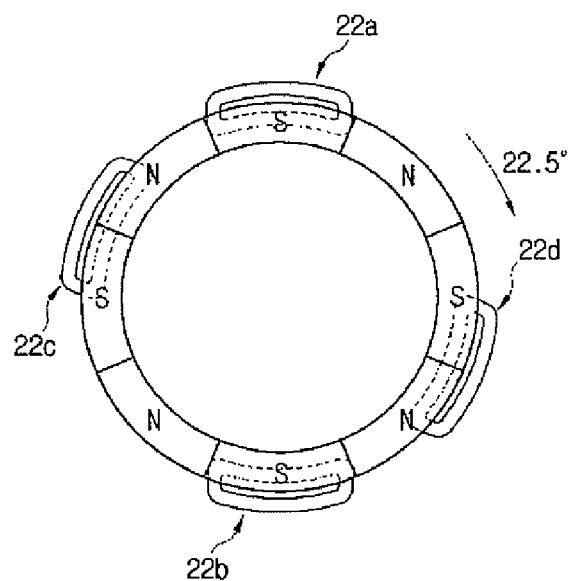
[Fig. 8]
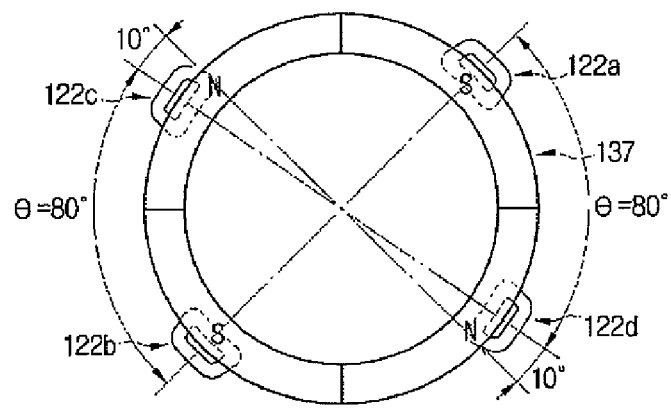

[Fig. 9]
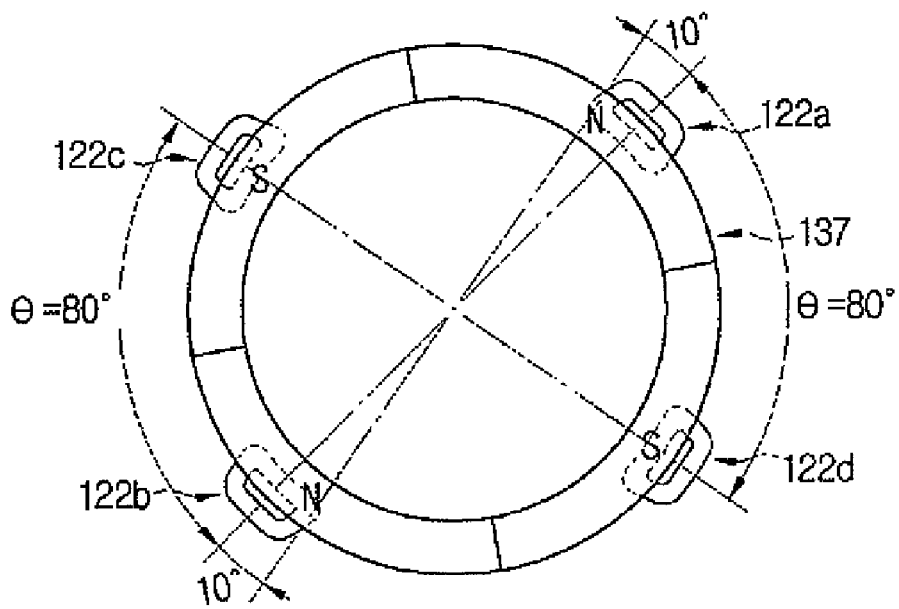
[Fig. 10]
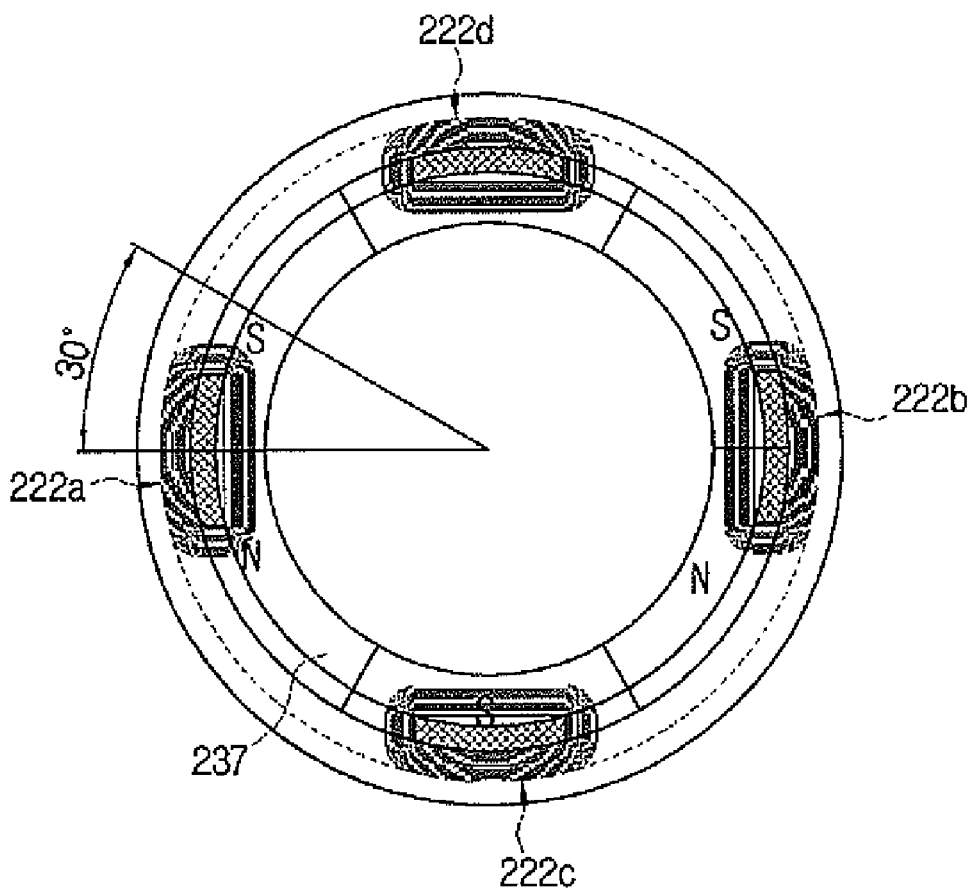

AUTOMATIC FOCAL POINT CONTROL FOR CAMERA

TECHNICAL FIELD

The present invention relates to an automatic focal point control apparatus for a camera, and more particularly, to an automatic focal point control apparatus for a camera in which a lens barrel is able to be adjusted precisely using a magnetic driving method.

BACKGROUND ART

Mechanical actuators, by which lenses are made to move linearly using gears by rotation of motors have been widely used as actuators for automatically controlling the focal point of cameras. However, when such mechanical actuators are used, it is impossible to avoid static and dynamic errors caused by the friction, mechanical modification or backlash resulting from driving motors and gears, so it is also impossible to precisely control such mechanical actuators. Accordingly, it is difficult to precisely control the focal point, and to make cameras compact due to the space required for motors and gears.

In order to solve the above problems arising from mechanical actuators, voice coil actuators have been developed. Voice coil actuators are used to control the linear motion using the Lorentz force generated by the induced magnetic force of coils in the static magnetic field produced by permanent magnets, and are suitable for precise linear motion for relatively short distances. Such voice coil actuators have been utilized in ultra-precise linear motion systems, for example, for moving pickup heads inside hard disks or optical discs. Such conventional voice coil actuators move lens barrels mounted inside housings linearly back and forth in order to automatically control the focal point of lenses.

However, since such conventional lens barrels inside housings are elastically supported only by leaf springs disposed on upper or lower portions of lens barrels without additional support members, axes of lenses are twisted when lens barrels move back and forth during the automatic focal point control operation. Additionally, it is difficult to maintain horizontal balance regardless of the movement of the lens barrels, and tilting to the left and right occurs, so that the precision of the focal point control is reduced. Furthermore, power needs to be continuously supplied when lens barrels move, so power consumption increases and coils become disconnected.

DISCLOSURE OF INVENTION

Technical Problem

The present invention provides an automatic focal point control apparatus for a camera, which enables a lens barrel firmly supported by a base inside a housing to linearly move back and forth while maintaining the horizontal balance in order to move the lens barrel precisely during an automatic focal point control operation.

The present invention also provides an automatic focal point control apparatus for a camera which increases the driving force for linearly moving a lens barrel back and forth and prevents power from being applied during an automatic focal point control operation, so that it is possible to reduce power consumption.

Technical Solution

According to an aspect of the present invention, there is provided an automatic focal point control apparatus to move a lens barrel mounted in a camera linearly back and forth, the apparatus including a base fixed in the camera, the base including a cylindrical projection which extends from a top surface thereof and into which a lower part of the lens barrel is inserted; a bobbin inserted into the cylindrical projection on the base, the bobbin including a plurality of electromagnets around which coils are wound and which are arranged at regular intervals along an outer circumference of the bobbin; a rotation body including a support ring, which is rotatably connected by screws to the outer circumference of the lens barrel, and a ring-shaped permanent magnet which is fixed onto an outer surface of the support ring and which has a plurality of N poles and an equal number of S poles alternately arranged on an outer surface at regular intervals; and a housing detachably mounted on the base, the housing including a space part formed thereinside to house the bobbin, rotation body and lens barrel, and a through hole formed thereinside so that light and images may be projected onto the lens barrel. If each pair of electromagnets facing each other from among the plurality of electromagnets is continuously driven, the rotation body may be made to rotate by the magnetic field generated by the plurality of electromagnets so that the lens barrel may be driven linearly back and forth along an axis.

The permanent magnet of the rotation body may have four N poles and four S poles alternately arranged at regular intervals, and the bobbin may have four electromagnets. The lowest angle between a first pair of electromagnets facing each other across the bobbin from among the four electromagnets and a second pair of electromagnets facing each other across the bobbin may be set to be approximately 67.5°. The permanent magnet may be set to an initial position in which the first pair of electromagnets are aligned coaxially with a pair of like poles facing each other, and in which axis lines passing through the second pair of electromagnets are aligned with boundary lines between pairs of opposite poles.

The permanent magnet of the rotation body may have two N poles and two S poles alternately arranged, and the bobbin may have four electromagnets. The lowest angle between a first pair of electromagnets facing each other across the bobbin from among the four electromagnets and a second pair of electromagnets facing each other across the bobbin may be set to be equal to or greater than 10 and less than 90°. The permanent magnet may be set to an initial position in which an axis line passing through the first pair of electromagnets are aligned coaxially with a first pair of like poles facing each other, and in which axis lines passing through the second pair of electromagnets are unaligned with axis lines passing through a second pair of like poles facing each other. In this situation, the permanent magnet of the rotation body may be made to rotate clockwise and counterclockwise by an angle equal to the set angle θ to move the lens barrel back and forth according to rotation by the same distance as the angle by which the permanent magnet rotates.

The permanent magnet of the rotation body may have three N poles and three S poles alternately arranged, and the bobbin may have four electromagnets.

One or more rotation preventing surfaces are formed on both the inner surface of the base and the outer surface of the lens barrel inserted into the base, and the one or more rotation preventing surfaces of the base face the one or more rotation preventing surfaces of the lens barrel, so it is possible to prevent the lens barrel from rotating when the lens barrel moves linearly.

Advantageous Effects

According to the exemplary embodiments of the present invention, the magnetic force produced by the magnetic field generated simultaneously by a pair of coils facing each other causes the rotation force of the rotation body to increase, and the force for driving the lens barrel linearly back and forth may thus increase.

Accordingly, when the lens barrel is moved, the rotation body may rotate horizontally without tilting, so it is possible to move the lens barrel precisely and to provide optimum photographing conditions with high operating reliability for automatically adjusting the focal point. Therefore, images having high quality may be captured.

Additionally, there is no need for power to be applied during the automatic focal point control operation, so it is possible to reduce power consumption.

BRIEF DESCRIPTION OF THE DRAWINGS

These and/or other aspects and advantages of the invention will become and more readily appreciated from the following description of the embodiments, taken in conjunction with the accompanying drawings of which:

FIG. 1 is an exploded, perspective view of an automatic focal point control apparatus for a camera according to a first exemplary embodiment of the present invention;

FIG. 2 is a sectional view of the automatic focal point control apparatus for a camera according to the first exemplary embodiment of the present invention;

FIG. 3 is a bottom view of a lens barrel shown in FIG. 2;

FIG. 4 is a plane view of a base shown in FIG. 1;

FIGS. 5 to 7 are schematic plane views for sequentially illustrating operations of the automatic focal point control apparatus for a camera according to the first exemplary embodiment of the present invention;

FIGS. 8 and 9 are schematic plane views for sequentially illustrating operations of an automatic focal point control apparatus for a camera according to a second exemplary embodiment of the present invention; and FIG. 10 is a schematic plane view of a permanent magnet and electromagnets of an automatic focal point control apparatus for a camera according to a third exemplary embodiment of the present invention.

BEST MODE FOR CARRYING OUT THE INVENTION

Hereinafter, the configuration of an automatic focal point control apparatus for a camera according to a first exemplary embodiment of the present invention will be described in detail with reference to FIGS. 1 to 4.

Referring to FIGS. 1 and 2, the automatic focal point control apparatus according to the first exemplary embodiment of the present invention to move a lens barrel 40 mounted in a camera (not shown) linearly back and forth includes a base 10, a bobbin 20, a rotation body 30, the lens barrel 40 and a housing 50.

The base 10 includes a transparent window 12 which is disposed in the center thereof and in a predetermined position inside the camera (not shown), for example, in a position facing a charge-coupled device (CCD) mounted in the camera. The base 10 includes a cylindrical projection 11 which extends from the top surface thereof and into which a lower part of the lens barrel 40 is inserted. The top end of the cylindrical projection 11 slides with the bottom surface of a permanent magnet 37. A lubricant receiving groove (not shown) into which a predetermined amount of lubricant flows may be formed along the top end of the cylindrical projection 11 in order to reduce the friction between the cylindrical projection 11 and the permanent magnet 37 to smoothly rotate the rotation body 30. The cylindrical projection 11 includes four first rotation preventing surfaces 15 formed on an inner surface 11a of the cylindrical projection 11. The first rotation preventing surfaces 15 are in contact with four second rotation preventing surfaces 45 of the lens barrel 40, so that the lens barrel 40 may be prevented from rotating inside the cylindrical projection 11 when the lens barrel 40 is driven linearly back and forth.

The bobbin 20 is formed in a ring shape, and is detachably mounted on the outer circumference of the cylindrical projection 11 on the base 10. The bobbin 20 includes four electromagnets 22a, 22b, 22c, 22d which are arranged at regular intervals along the outer circumference of the bobbin 20. The four electromagnets 22a, 22b, 22c, 22d include four wind-up portions 24a, 24b, 24c, 24d which extend orthogonally from the bobbin 20 in the same direction, and four coils 23a, 23b, 23c, 23d which are wound around the four wind-up portions 24a, 24b, 24c, 24d, respectively.

In this exemplary embodiment of the present invention described above, if an electric current is applied to the electromagnets 22a, 22b, 22c, 22d, the magnetic field is generated simultaneously by a pair of electromagnets facing each other, so that the rotation force for rotating the rotation body 30 may increase to twice the level of the conventional art. Additionally, the rotation body 30 may be prevented from tilting during rotation, so the lens barrel 40 may be driven linearly back and forth while being held horizontally. Accordingly, it is possible to accurately move the lens barrel 40.

The rotation body 30 includes a support ring 31 and the permanent magnet 37. The support ring 31 includes a screw thread 33 formed along the inner circumference thereof in order to be rotatably connected by screws to a screw thread 43 formed on the outer circumference of the lens barrel 40. Additionally, a flange portion 32 is formed along the upper outer circumference of the support ring 31.

The permanent magnet 37 is formed in a ring shape, of which an inner circumference and a top surface are tightly fixed onto the outer surface of the support ring 31 and a bottom surface of the flange portion 32, respectively. The permanent magnet 37 has four N poles and four S poles alternately arranged at regular intervals (see FIG. 5).

The position of the rotation body 30 is set so that the permanent magnet 37 is disposed above the four electromagnets 22a, 22b, 22c, 22d at a predetermined distance. More specifically, referring to FIG. 5, the eight poles of the permanent magnet 37 are alternately arranged at approximately 45°. Additionally, the four electromagnets 22a, 22b, 22c, 22d of the bobbin 20 are disposed so that the first and second electromagnets 22a, 22b among the four electromagnets 22a, 22b, 22c, 22d face each other across the bobbin 20, and the third and fourth electromagnets 22c, 22d face each other across the bobbin 20. In this situation, the lowest angle between the first and second electromagnets 22a, 22b and the third and fourth electromagnets 22c, 22d is set to be approximately 67.5°.

The four second rotation preventing surfaces 45 of the lens barrel 40 are formed on an outer surface of a lower part 41 of the lens barrel 40 which is inserted into the cylindrical projection 11 of the base 10, and face the four first rotation preventing surfaces 15 formed on the inner surface 11a of the cylindrical projection 11. While the four first and four second rotation preventing surfaces 15 and 45 facing each other are formed in order to prevent the lens barrel 40 from rotating when the lens barrel 40 is driven back and forth in this exemplary embodiment of the present invention, there is no limitation thereto. Accordingly, only at least one first rotation preventing surface 15 and at least one second rotation preventing surface 45 may be formed to prevent the rotation of the lens barrel 40.

The housing 50 includes a predetermined space part formed inside to comprise the bobbin 20, rotation body 30 and lens barrel 40, and a bottom end of the housing 50 is detachably mounted to the base 10. Additionally, the housing 50 includes a through hole 53 formed on the top thereof so that light and images are projected onto a lens (not shown) of the lens barrel 40.

Hereinafter, operations of the automatic focal point control apparatus configured as described above according to the first exemplary embodiment of the present invention will be described in detail with reference to FIGS. 5 to 7.

Referring to FIG. 5, the permanent magnet 37 of the rotation body 30 is set to an initial position in which the first and second electromagnets 22a, 22b are aligned coaxially with a pair of N poles facing each other, and in which axis lines passing through the third and fourth electromagnets 22c, 22d, deviate from axis lines passing through the other pair of N poles facing each other toward axis lines passing through the first and second electromagnets 22a, 22b by approximately 22.5°.

In this situation, in order to linearly move the lens barrel 40 by rotating the rotation body 30 clockwise or counterclockwise, an electric current is applied to only the third and fourth electromagnets 22c, 22d while not being applied to the first and second electromagnets 22a, 22b, so that S-pole magnetic fields may be generated respectively in the third and fourth electromagnets 22c, 22d. Accordingly, as shown in FIG. 6, the permanent magnet 37 rotates clockwise approximately 22.5° and stops when a pair of N poles are aligned coaxially with the third and fourth electromagnets 22c, 22d. The axis lines passing through the first and second electromagnets 22a, 22b are aligned with each of the boundary lines between the pairs of S and N poles. Accordingly, the rotation body 30 may be made to rotate clockwise approximately 22.5° by the permanent magnet 37, so that the lens barrel 40 may linearly move a predetermined distance. Here, the distance in which the lens barrel 40 linearly moves may be determined according to pitches of the screw threads 33 and 43 formed in the rotation body 30 and the lens barrel 40, respectively.

In this situation, in order to continuously move the lens barrel 40 linearly in the same direction, the electric current applied to the third and fourth electromagnets 22c, 22d is cut off, and an electric current is applied to the first and second electromagnets 22a, 22b so that N-pole magnetic fields may be generated respectively in the first and second electromagnets 22a, 22b. Accordingly, as shown in FIG. 7, the permanent magnet 37 rotates clockwise approximately 22.5° and stops when boundary lines between pairs of S and N poles facing each other are aligned with the axis lines passing through the third and fourth electromagnets 22c, 22d. The first and second electromagnets 22a, 22b are aligned coaxially with the S poles facing each other. Therefore, the lens barrel 40 may linearly move a predetermined distance by the rotation body 30 rotating clockwise approximately 22.5° due to the magnetic force of the permanent magnet 37.

In order to move the lens barrel 40 in a direction opposite to the linear motion direction described above in the same manner as described above, the direction of the electric current applied to the four electromagnets 22a, 22b, 22c, 22d is reversed so that the rotation body 30 is made to rotate counterclockwise.

As described above, when the lens barrel 40 moves clockwise or counterclockwise according to the rotation of the rotation body 30, the second rotation preventing surfaces 45 of the lens barrel 40 slide with the first rotation preventing surfaces 15 of the base 10 while in contact with each other, so the lens barrel 40 may linearly move an accurate moving distance rather than being rotated according to the rotation of the rotation body 30.

Therefore, according to the first exemplary embodiment of the present invention, the lens barrel 40 is able to freely move according to a distance between an object and the lens barrel within the movable distance, and it is possible to automatically set the focal point distance with greater precision.

According to a second exemplary embodiment of the present invention, an automatic focal point control apparatus is able to select one of two modes, namely, a general capturing mode and a short distance capturing mode. The automatic focal point control apparatus according to the second exemplary embodiment of the present invention has a substantially similar configuration to the automatic focal point control apparatus according to the first exemplary embodiment of the present invention described above. However, the second exemplary embodiment of the present invention is distinct from the first exemplary embodiment of the present invention in the number of poles of the permanent magnet 137 and the setting position of electromagnets 122a, 122b, 122c, 122d of the bobbin 20. Accordingly, description of the same configuration as the first exemplary embodiment of the present invention is omitted, and only different configurations and operations will be described with reference to FIGS. 8 and 9.

Referring to FIG. 8, the permanent magnet 137 has two N poles and two S poles alternately arranged at regular intervals, that is, approximately 90°. Additionally, the four electromagnets 122a, 122b, 122c, 122d of the bobbin 20 are disposed so that the first and second electromagnets 122a, 122b among the four electromagnets 122a, 122b, 122c, 122d face each other across the bobbin 20, and the third and fourth electromagnets 122c, 122d face each other across the bobbin 20. In this situation, the lowest angle θ between the first and second electromagnets 122a, 122b and the third and fourth electromagnets 122c, 122d is set to be equal to or greater than 10° and less than 90°. For example, in the second exemplary embodiment of the present invention, the angle θ is set to be approximately 80°.

Hereinafter, operations of the automatic focal point control apparatus according to the second exemplary embodiment of the present invention will be described in detail with reference to FIGS. 8 and 9. Referring to FIG. 8, in the general capturing mode, the permanent magnet 137 of the rotation body 30 is set to an initial position in which the first and second electromagnets 122a, 122b are aligned coaxially with a pair of S poles facing each other, and in which axis lines passing through the third and fourth electromagnets 122c, 122d deviate from axis lines passing through the other pair of S poles facing each other toward axis lines passing through the first and second electromagnets 122a, 122b by approximately 10°. In this situation, when a camera or a mobile phone having the automatic focal point control apparatus according to the second exemplary embodiment of the present invention is moved toward an object, the automatic focal point control apparatus determines the distance detected by a distance sensor to convert the general capturing mode to the short distance capturing mode, so that the lens barrel 40 is operated in the short distance capturing mode.

In more detail, a process for converting the general capturing mode to the short distance capturing mode, includes cutting off electric current applied to the first and second electromagnets 122a, 122b and applying electric current to the third and fourth electromagnets 122c, 122d so that N-pole magnetic fields may be generated respectively in the third and fourth electromagnets 122c, 122d, when the permanent magnet 137 is disposed in the initial position shown in FIG. 8. Accordingly, as shown in FIG. 9, the permanent magnet 137 rotates clockwise approximately 80° and stops when a pair of S poles are aligned coaxially with the third and fourth electromagnets 122c, 122d.

In this situation, the axis lines passing through the first and second electromagnets 122a, 122b are aligned with lines deviating from axis lines passing through a pair of N poles by approximately 10°. Therefore, the lens barrel 40 may linearly move a predetermined distance by the rotation body 30 rotating clockwise approximately 80° due to the magnetic force of the permanent magnet 137.

Alternatively, a process for converting the short distance capturing mode to the general capturing mode, includes cutting off electric current applied to the third and fourth electromagnets 122c, 122d and applying electric current to the first and second electromagnets 122a, 122b so that S-pole magnetic fields may be generated respectively in the first and second electromagnets 122a, 122b, when the permanent magnet 137 is disposed in the position shown in FIG. 9. Accordingly, as shown in FIG. 8, the permanent magnet 137 rotates counterclockwise approximately 80° and stops when a pair of S poles are aligned coaxially with the first and second electromagnets 122a, 122b. In this situation, the axis lines passing through the third and fourth electromagnets 122c, 122d are aligned with lines deviating from the axis lines passing through between a pair of N poles by approximately 10°. Therefore, the rotation body 30 is made to rotate counterclockwise approximately 80° by the permanent magnet 137, so the lens barrel 40 may linearly move a predetermined distance in a direction reverse to the linear motion direction in the process for converting the general capturing mode to the short distance capturing mode, thereby being in the general capturing mode.

The configuration of an automatic focal point control apparatus according to a third exemplary embodiment of the present invention is substantially similar to that of the automatic focal point control apparatus according to the first exemplary embodiment of the present invention described above. However, referring to FIG. 10, a permanent magnet 237 has three N poles and three S poles alternately arranged at regular intervals, and the bobbin has four electromagnets 222a, 222b, 222c, 222d which are arranged at regular intervals (for example, approximately 90°) along the outer circumference of the bobbin 20.

Referring to FIG. 10, the permanent magnet 237 of the rotation body 30 is set to an initial position in which a pair of electromagnets facing each other across the bobbin from among the four electromagnets 222a, 222b, 222c, 222d pivot about axis lines passing through opposite poles facing each other by approximately 30°. The moving operation of the lens barrel 40 is performed in the same manner as in the first exemplary embodiment of the present invention.

The invention claimed is:

1. An automatic focal point control apparatus to move a lens barrel mounted in a camera linearly back and forth, the apparatus comprising:

a base fixed in the camera, the base comprising a cylindrical projection which extends from a top surface thereof and into which a lower part of the lens barrel is inserted;

a bobbin inserted into the cylindrical projection on the base, the bobbin comprising a plurality of electromagnets around which coils are wound and which are arranged at regular intervals along an outer circumference of the bobbin;

a rotation body comprising a support ring, which is rotatably connected by screws to the outer circumference of the lens barrel, and a ring-shaped permanent magnet which is fixed onto an outer surface of the support ring and which has a plurality of N poles and an equal number of poles alternately arranged on an outer surface at regular intervals; and a housing detachably mounted on the base, the housing comprising a space part formed thereinside to house the bobbin, rotation body and lens barrel, and a through hole formed therein side so that light and images are projected onto the lens barrel, wherein, if each pair of electromagnets facing each other from among the plurality of electromagnets is continuously driven and the rotation body is made to rotate by the magnetic field generated by the plurality of electromagnets so that the lens barrel is driven linearly back and forth along an axis, and wherein the permanent magnet of the rotation body has four N poles and four S poles alternatively arranged at regular intervals and the bobbin has four electromagnets.

2. The apparatus of claim 1, wherein the lowest angle between a first pair of electromagnets facing each other across the bobbin from among the four electromagnets and a second pair of electromagnets facing each other across the bobbin is set to be approximately 67.5°; and the permanent magnet is set to initial position in which the first pair of electromagnets are aligned coaxilly with a pair of like poles facing each other, and in which axis lines passing through the second pair of electromagnets are aligned with boundary lines between pairs of opposite poles.

3. The apparatus of claim 1, wherein the permanent magnet of the rotation body has two N poles and two S poles alternatively arranged, and the bobbin has four electromagnets.

4. The apparatus of claim 3, wherein the lowest angle θ between a first pair of electromagnets facing each other across the bobbin from among the four electromagnets and a second pair of electromagnets facing each other across the bobbin is set to be equal to or greater than 10° and less than 90° and the permanent magnet is set to an initial position in which the first pair of electromagnets are aligned coaxially with a first pair of like poles facing each other, and in which axis lines passing through the second pair of electromagnets are unaligned with axis lines passing through a second pair of like poles facing each other.

5. The apparatus of claim 4, wherein the permanent magnet of the rotation body is made to rotate clockwise and counterclockwise by an angle equal to the set angle θ to move the lens barrel back and forth according to rotation by the same distance as the angle by which the permanent magnet rotates.

6. The apparatus of claim 1, wherein the permanent magnet of the rotation body has three N poles and three S poles alternatively arranged, and the bobbin has four electromagnets.

7. The apparatus of claim 6, wherein the four electromagnets are arranged at regular intervals of approximately 90°; and the permanent magnet is set to an initial position in which the first pair of electromagnets are aligned coaxially with opposite poles facing each other, and in which the second pair of electromagnets are aligned coaxially with boundary lines between pairs of opposite poles facing each other.

8. The apparatus of any one of the claims 1 and 2 to 7, wherein one or more rotation preventing surfaces are formed on both the inner surface of the base and the outer surface of the lens barrel inserted into the base, and the one or more rotation preventing surfaces of the base face the one or more rotation preventing surfaces of the lends barrel.

* * * * *